Feb. 23, 1943.   J. L. HOWIE, JR   2,312,215
METHOD OF AND MACHINE FOR MOLDING PLASTICS
Filed July 22, 1938    6 Sheets-Sheet 2

INVENTOR.
John L. Howie, Jr.
BY George H. Simmons
ATTORNEY.

Feb. 23, 1943.   J. L. HOWIE, JR   2,312,215
METHOD OF AND MACHINE FOR MOLDING PLASTICS
Filed July 22, 1938   6 Sheets-Sheet 3

Fig.3.

INVENTOR.
John L. Howie Jr.
BY George H. Simmons
ATTORNEY.

Patented Feb. 23, 1943

2,312,215

UNITED STATES PATENT OFFICE 2,312,215

METHOD OF AND MACHINE FOR MOLDING PLASTICS

John L. Howie, Jr., Decatur, Ill., assignor to The Grigoleit Company, Decatur, Ill., a corporation of Illinois Application July 22, 1938, Serial No. 220,724

11 Claims. (Cl. 18—16)

This invention relates to a method of and machine for molding plastics and has for its principal object the provisions of improvements which simplify the operations to be performed by the operator and minimize the human element in the cycle of operations.

It is a main object of the invention to provide a process of molding wherein the molding dies are maintained in molding position a larger percentage of the operating time than has been possible heretofore.

A further object of the invention lies in the provision of an improved machine for carrying the process into effect, a machine which is simple and inexpensive to construct and maintain.

Still another object of the invention provides a simple high speed device for unscrewing threaded articles from the dies of the machine.

Still another object of the invention lies in the provision of means for automatically loading the recesses of a multiple die with quantities of moldable material.

Further objects of the invention, not specifically mentioned here, will be apparent from the detailed description and claims which follow, reference being had to the accompanying drawings in which a preferred embodiment of the invention is shown by way of example and in which:

In the molding of plastics, such as for example phenol condensation products, complementary die sections are formed to define the contours of the article that is to be molded and closed over a quantity of moldable material which has precisely the correct volume to produce the article. The dies are closed under suitable pressure and maintained at a temperature high enough to cause the material to soften so that it may be forced into the die spaces under pressure which is maintained for a period of time sufficient to cause the material to cure and set to its final form.

In one type of machines, in common use heretofore for molding, one die member is held stationary and the other die member is mounted upon a movable ram that is moved into engagement with the stationary die member by hydraulic or mechanical means to close the die to mold and cure the articles. As soon as the curing process has been completed, the movable member is backed away from the stationary member sufficiently to permit removal of the completed parts from the dies. In the case the article being molded is threaded either interiorly or exteriorly it must be unscrewed from the die part, and this may be done manually or by the use of tools adapted to engage one or more of the articles. In either case, it has been necessary heretofore to open the dies to a distance sufficiently great to permit the workman to insert his hands or a tool between the dies in order to remove the completed articles therefrom.

The ram and associated die parts are massive and move slowly and consequently where the distance to be travelled is great, an appreciable time is required for opening the dies. Further time is required for unscrewing the threaded articles from the dies and for reloading the dies in readiness for the next cycle operation.

In certain prior art machines of which I am aware, efforts have been made to reduce the loading and unloading time by providing a machine by which the dies are separated first to give them clearance and then the die member containing the parts has been rotated into a plane disposed substantially at right angles to the molding plane so as to render the articles more accessible for removal. In other prior art machines, automatic operation has been achieved by providing a plurality of individual dies which are movable successively through loading, curing and unloading positions. Such latter machines, while more expensive to construct and maintain than the others, require less time for loading and unloading the individual dies and as a result, the dies are maintained in closed or curing position a larger percentage of the operating time of the machine and production is therefore increased.

The present invention seeks in its main object to provide a simple, inexpensive machine of the manual or semi-automatic type which is capable of maintaining the dies in closed position during a percentage of the operating time of the machine comparable with that achieved by the more expensive automatic machines of the prior art.

In the preferred embodiment of the invention this result is achieved by providing dies which are movable laterally as well as vertically. The dies are first moved vertically only far enough to provide clearance between them and are then simultaneously moved laterally, one in one direction and the other in the opposite direction into loading and unloading positions respectively. Automatic means are provided for loading the die that is in loading position and while this is happening, other automatic means are unloading the complementary die part to remove the articles therefrom. The unloading means is arranged to unscrew threaded articles from the die parts when required.

This preferred form of machine can be built for a fraction of the cost of an automatic machine. The operations required to be performed by the attendant of the machine are few and simple and consequently little difficulty is experienced in maintaining the dies closed in curing position for as much of the operating time of the machine as in the automatic machines. As the result, the operation of the machine is efficient and the molding cost of producing articles on the machine is very low. A single attendant may service several machines if desired so that the labor cost of operating the machines will not be unduly high.

Referring now to the drawings in more detail, particularly Figures 1 to 6 inclusive, the molding machine incorporating the teachings of the present invention comprises a supporting frame work having horizontal members 1 and 2 that are supported upon legs 3 which are suitably braced by inclined members 4 and horizontal braces 5 and 6. The particular details of this frame structure are not of the essence of the present invention and may be modified, it being sufficient that the supporting structure be rugged enough to withstand the strains put on it when in use and being designed to support the operating parts of the machine at a height convenient for the operator. The frame may be formed of angles or other structural shapes as desired.

Supported on the frame thus formed are a pair of strain members 7 and 8, each of which consist of a unitary hollow rectangle composed preferably of rolled steel and having sufficient thickness to give the requisite strength to the members. In practice, these members may be formed from a sheet of rolled steel of suitable thickness, in one instance thickness being three inches, by cutting a rectangular opening in the sheet leaving only the hollow rectangular frame.

Strain members 7 and 8 are disposed vertically and disposed along the top rails 1 and 2 of the supporting frame work, being attached thereto in any preferred method such as by welding, and suitable braces 9 may be fixed to the members 7 and 8 and the horizontal frame members 1 and 2 to hold the members 7 and 8 more securely.

Mounted in the rectangular opening in strain members 7 and 8 and on the bottom horizontal portions thereof is a hydraulic cylinder 10 in which is fitted a ram 11, there being a packing member 12 surrounding the ram and held in place by a packing collar 13 to form a pressure tight joint. Fluid pressure is applied to the cylinder through a suitable pipe 14, as will hereinafter appear.

Figure 1:
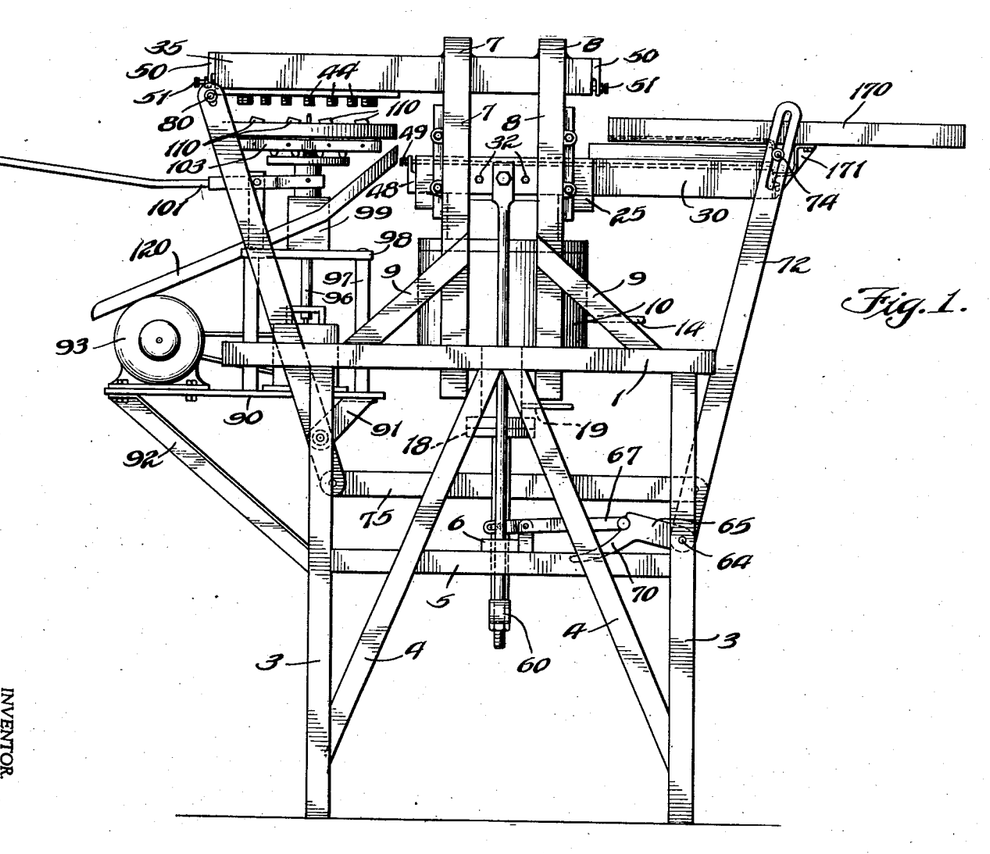
Figure 1 is a front elevational view of a molding machine with the dies open and in loading and unloading positions respectively.
Figure 2:
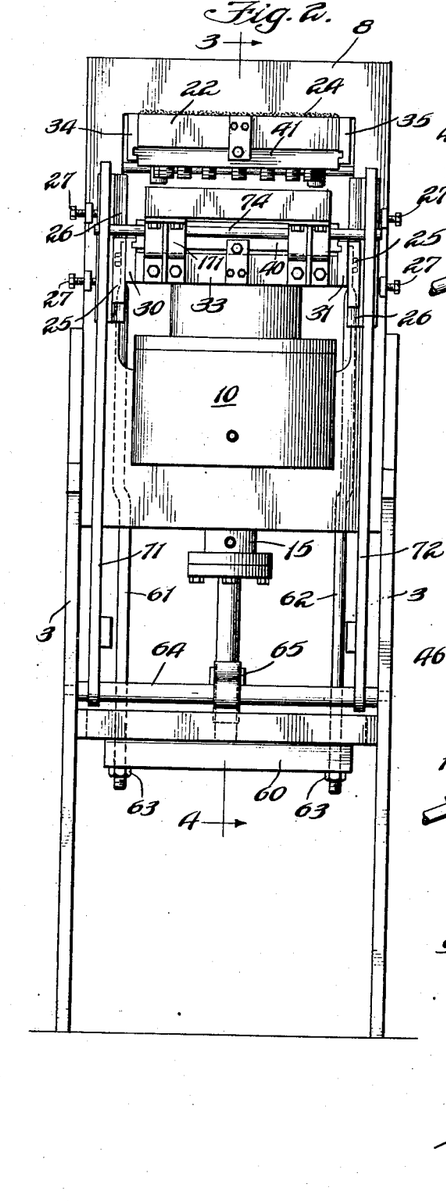
Figure 2 is an end elevational view of Figure 1.

Depending from the cylinder 10 is a smaller hydraulic pull back cylinder 15 that is located concentrically of the cylinder 10, as will be seen in Figures 1 and 2, cylinder 15 being provided with a ram 16 and with a packing gland 17 that surrounds the ram and is held in place by a collar 18 to form a pressure tight joint. Fluid pressure is admitted to the cylinder 15 through a suitable pipe 17, as will presently appear.

Mounted upon the ram 11 is a platen 19 which consists of a flat rectangular block of metal having sufficient thickness to enable it to withstand the stress placed upon it in operation of the machine. In practice I have found it convenient to form the platen 20 from the rectangular piece of scrap cut from one of the strain members 7 or 8. Embedded in the platen are ducts 21 that are connected to a source of steam which serves to heat the platen and die carried thereby to the temperature required for curing the plastic that is to be molded in the machine. The platen is fixed upon the ram in any preferred manner such as by screws, best seen in Figure 3. A sheet of heat insulating material 11' is interposed between the platen and ram and serves to retard the passage of heat therebetween. Insulation 11' may conveniently be asbestos, or other suitable fibrous material that is capable of withstanding both heat and pressure.

Fixed to the upper horizontal portions of strain members 7 and 8 is a similar rectangular platen 22 in which are embedded steam ducts 23 to heat the same. The platen 22 is fixed to the strain members 7 and 8 in any preferred manner such as by welds indicated at 24 in the drawings.

Although steam ducts 21 and 23 are mentioned, it will be apparent to one skilled in the art that other heating means such as for example, gas or electricity may be used and that in certain cases, where the plastic can be cold molded, no heating means will be needed. In cases where no heating means is employed, the sheet of insulating material 11' may be omitted.

Figure 3:
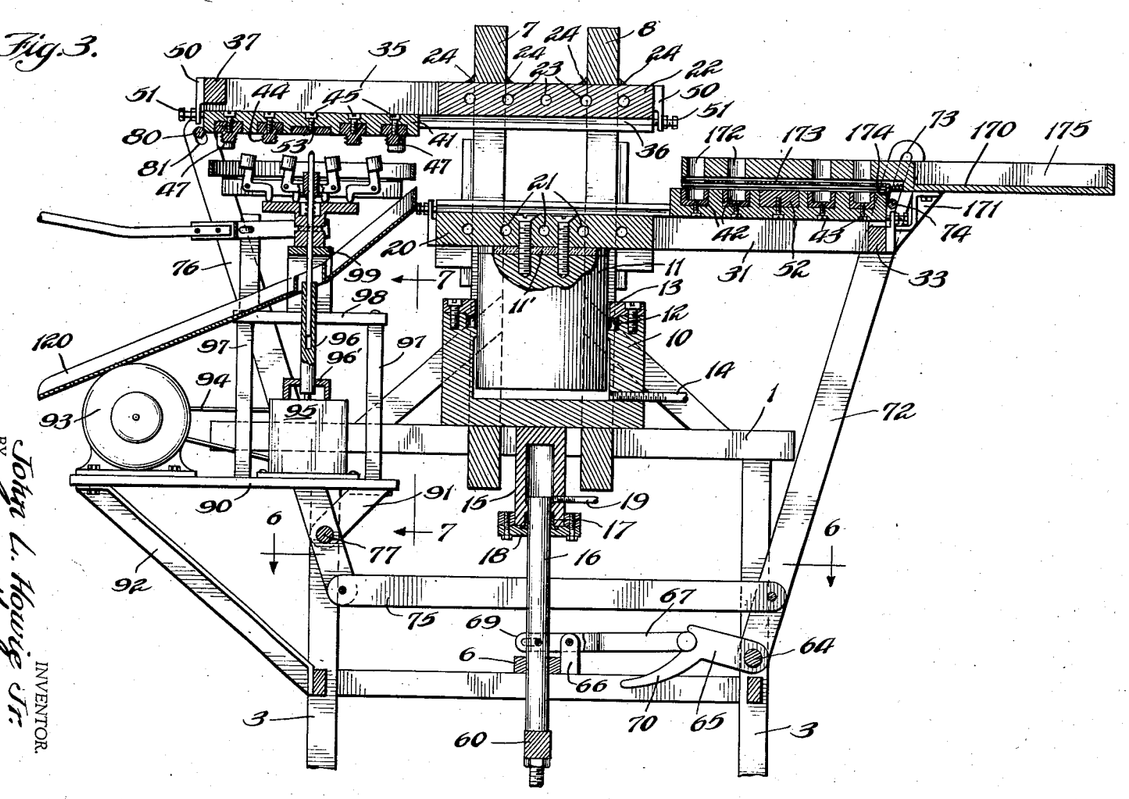
Figure 3 is a cross-sectional view taken substantially along the line 3—4 of Figure 2 looking in the direction of the arrows and showing the dies open and in loading and unloading position.

As will be seen best in Figures 2 and 3, a pair of guide rails 30 and 31 are fixed to the edges of platen 20 in any preferred manner such as by stud screws 32, Figure 1, the guide rails extending above the top surface of the platen and containing grooves in their extending portions. The guide rails are disposed between the edges of platen 20 and the vertical portions of the strain members 7 and 8, but do not engage with the strain members. Guide rails 30 and 31 extend beyond the platen to the right, Figures 1, 3 and 4, being connected together at their outer ends by a transverse member 33 which is fixed to the guide rails preferably by welding.

Mounted upon each of the guide rails 30 and 31 and projecting outwardly therefrom are guide blocks 25 which extend below the platen 20. Mounted upon strain members 7 and 8 are guideways 26 which have bevelled edges that are engaged with bevelled edges on the guide blocks 25. By this arrangement, the platen is guided in vertical movement. Guideways 26 are mounted by stud bolts projected through slots in the guideways and there are adjusting screws 27 threaded through bosses welded on and extending from the strain members 7 and 8. These adjusting screws bear against the guideways and may be adjusted to move the guideways and compensate for wear.

Platen 22 is similarly equipped with guide rails 34 and 35 which extend below the lower face of the platen and which contain a groove 36, Figure 3, in this extending portion. Guide rails 34 and 35 extend to the left of the platen 22, Figure 3, and are fixed together at their outer end by a suitable transverse member 37 which member is attached to the rails preferably by welding.

The guide rails serve as supports for die bases 40 and 41 each of which is provided with extending tongues that are registered in the grooves in the guide rails 30 and 31 and 34 and 35 respectively to mount the die bases for sliding movement along the rails. Contained in the die base 40 are a plurality of sockets in which are nested die parts 42, which are held therein by suitable screws 43 extending through the die base. As shown in the drawings, die parts 43 are cavities shaped to form the exterior contour of the article that is to be molded in the machine.

Die block 41 contains a similar plurality of sockets in which are nested die parts 44 that are held in there by screws 45. The die parts 44 are shaped to form the interior surfaces of the article that is to be molded in the machine, each part 44 being provided with a threaded extension.

In the embodiment of the invention shown in the drawings by way of example, the die base 40 carries the female die part and the die base 41 carries the male die part and this is the preferred arrangement, but it will be understood that either die part can be carried on either die base within the teachings of the invention.

As will be seen in Figures 2 and 3, die base 40 contains a plurality of accurately located sleeved sockets 46 and die base 41 carries a like plurality of machined guide pins 47, Figure 3, adapted to be registered with the sockets 46. By this means, the die parts are accurately located with respect to each other preparatory to closing the die parts together, and since pins 47 are longer than the projecting portions of the die parts 44, this accurate alignment is achieved before the projecting portions of the die parts 44 enter into the recesses of the die parts 43. Preliminary location of the die bases 40 and 41 in closing position is determined by a stop block 48 located upon the platen 20, Figure 3, and containing an adjusting screw 49 that is locked by suitable means. Platen 22 contains a similar block 50 that is provided with an adjusting screw 51. Final alignment is made by the guide pins 47 which, it will be noted, are tapered slightly at their free ends so as to permit them to enter the sockets 46 even though not exactly aligned therewith.

Figures 4, 10:
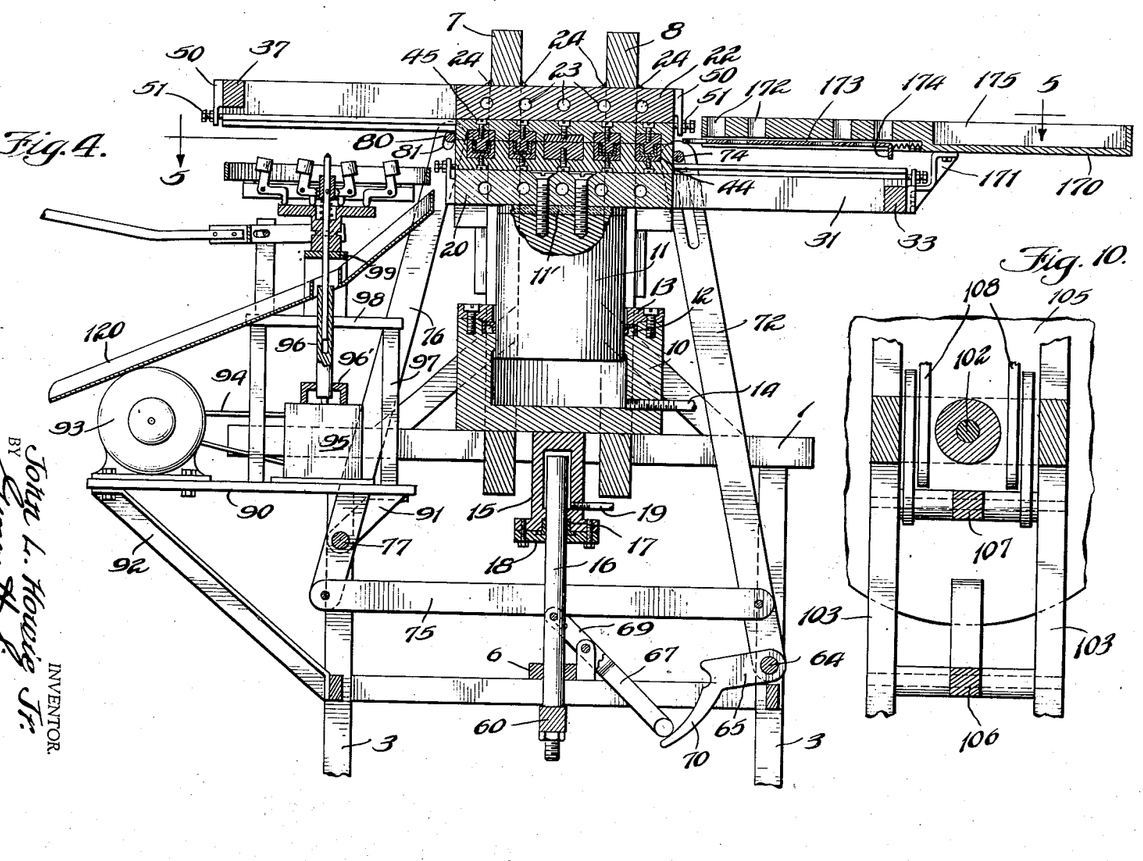
Figure 4 is a view similar to Figure 3 likewise along the line 3—4 of Figure 2 but showing the dies closed.
Figure 10 is a fragmentary plan view showing the bell cranks of the unloading mechanism.

When the recesses in the dies have been loaded with a quantity of moldable material, the dies are moved into position for closing, in a manner to be hereinafter described, by fluid pressure admitted into the cylinder 10 through pipe 14 to raise the ram 11 and parts carried thereby into engagement with the complementary parts carried upon platen 22, the upper movement of the piston being limited by a stop block or land 52 carried upon die base 40 engaging with a similar stop block or land 53 carried upon die base 41, the dies being then closed in curing position, as shown in Figure 4 to form and cure the article from the moldable material. It will be noted that when the ram is in its lowermost position and the die parts are separated preparatory to being moved laterally, as will be seen best in Figures 2 and 3, there is no substantial amount of clearance between die parts, this arrangement being used to limit the length of travel required of the ram 11 and parts carried thereby to a minimum thereby to increase the speed of operation of the machine. Since the ram 11 and the cylinder containing it are large and considerable amount of weight is involved, the travel of the ram is relatively slow and a great deal of time will be lost if the ram has a considerable distance to travel.

The small clearance between the die parts when they have been separated is compensated for under the teachings of the present invention by simultaneously moving the die parts laterally in opposite directions so as to render them accessible for unloading and loading and inspection, as may be required. To this end in the embodiment of the invention shown in the drawings by way of example, the pull down ram 16 carries a yoke 60 that extends transversely on the machine and is connected to the platen 20 by tie rods 61 and 62 disposed on opposite sides of the cylinder 10 and connected to the platen and yoke by suitable means such as bolts. The lower ends of the rod 61 and 62 preferably extend through the yoke 60 and are threaded to receive a nut 63, this arrangement permitting the position of the yoke 60 to be adjusted with respect to the platen 20. Journalled in and extending between the legs 3 at one end of the machine, at the right as seen in Figures 1, 3, 4 and 6 is a shaft 64 to which is keyed a cam 65 that is located upon the median line of the machine. Fixed upon the transverse frame member 6 is a bracket 66 that forms a pivot support for a lever 67 that is bifurcated and connected to the ram 16 by a pin 68 that extends through slots 69 in the ends of the lever. By this arrangement, as ram 16 is moved upwardly as it will be when the main ram 11 moved upwardly to close the dies, lever 67 is rotated in a clockwise direction, Figure 3, to rotate the cam 65 and shaft 64 in a counter-clockwise direction. The position of the lever 67 and cam 65 in one extreme position is shown in Figure 3 when the dies are opened and in Figure 4, the other extreme position is shown with the dies closed. Cam 65 is shaped so that during the first portion of the movement of the parts of the machine lever 67 will rotate shaft 64 and that additional movement of the lever 67 will cause it to ride over the arcuate portion 70 of the cam 65 without further rotating the shaft 64.

Shaft 64 carries a pair of levers 71 and 72, Figures 1 to 4 inclusive, which are keyed thereto and extended upwardly therefrom near the front and back sides of the machine, respectively. Levers 71 and 72 contain slots 73 at their upper ends into which a cross rod 74 is extended, the cross rod extending between the levers 71 and 72 and along the outer end of the die base 40, being fixed to this die base in any preferred manner such as welding. By this arrangement as the ram 11 is moved upwardly to close the dies, die base 40 is moved transversely of the machine during the initial portion of the travel of the ram to bring it into position for registration with the die base 41. During the initial movement of the ram 11 downwardly to open the die lever 67 rides over the arcuate portion of the cam 65 and the die base 40 is not moved. During the latter portion of the downward movement of the ram lever 67 moves cam 65 to rotate shaft 64 in a clockwise direction thereby to move levers 71 and 72 outwardly of the machine and with them the die block 40, the parts coming to rest in the position in which they are shown best in Figure 3.

As will be seen in Figures 1, 3, 4, 5 and 6, lever 72 is connected by a tie rod 75 to a lever 76 that is pivoted at 77 to the leg 3 at the opposite end of the machine, and lever 71 is similarly connected by tie rod 78 to a lever 79 that is pivoted to the front leg 3 at the opposite end of the machine. Levers 76 and 79 extend upwardly and terminate on opposite sides of the die base 41 and are connected thereto by a cross rod 80 that fits into slots 81 in the ends of the levers. By this arrangement, as shaft 64 is rotated in a counter-clockwise direction, levers 76 and 79 will be rotated in a clockwise direction on their respective pivots to move cross rod 80 to the right and thereby move die base 80 to the right into registration with the die base 40, and movement of shaft 64 in an opposite direction moves the levers and parts in an opposite direction.

In the embodiment of the invention shown in the drawings the dies are arranged to form an internally threaded article such as a bottle cap, and as the dies are opened at the completion of the curing of the molding material, the article will be drawn from the recessed die part carried in die base 40 and will move with the die part carried on the die base 41. The article must be unscrewed from the die part to permit its removal from the machine and this must be quickly done so as to remove the article before it has cooled and shrunk to final size. Since the die base 41 carries a plurality of die parts, there will be a corresponding plurality of articles to be removed.

Figure 5:
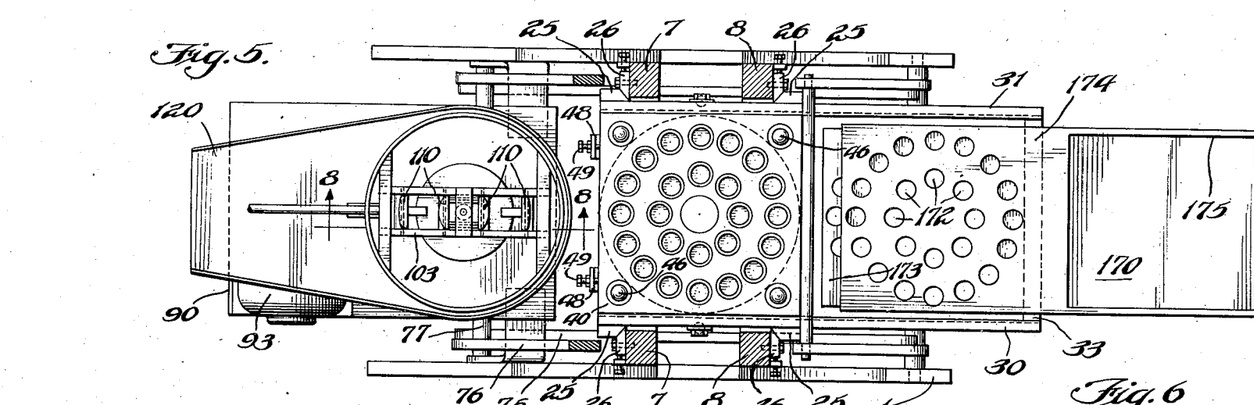
Figure 5 is the top side plan view taken substantially along the line 5—5 of Figure 4 with the upper die member removed.
Figure 6:
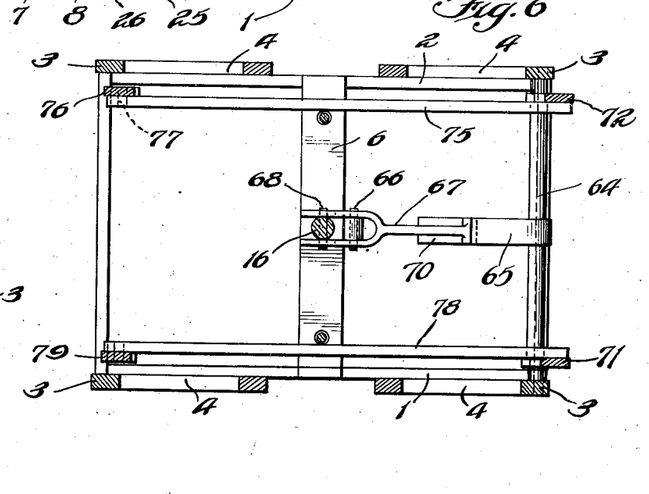
Figure 6 is a cross-sectional view through the supporting structure taken substantially along the line 6—6 of Figure 3 and showing the die moving linkage.

As will be seen in Figure 5, the die parts 44 may be arranged in concentric circles centered upon the center of the die base 41 rather than in parallel rows such as has been the practice heretofore. In order to permit rapid removal of the articles from the die parts under these circumstances, there is shown in the drawings a so-called unloading device which will now be explained.

Figure 7:
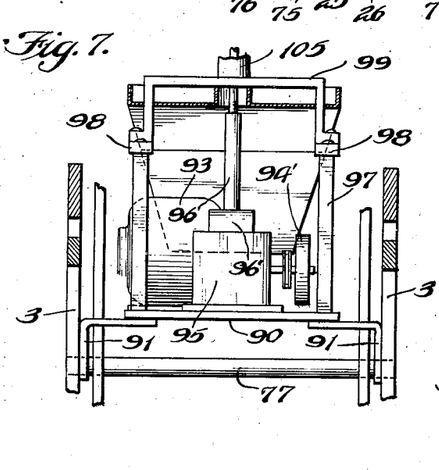
Figure 7 is a fragmentary elevational view, partly in section, showing the unloading mechanism.

As will be seen in Figures 3 and 7, a sub base 90 is supported by suitable brackets 91 upon the pivot 77 by which the die moving levers are mounted in the machine, this base being braced by a suitable member 92 extending downwardly at an angle and engaging a transverse frame member. Mounted upon this base is a source of power such as an electric motor 93 which is connected by a suitable belt 94 to a speed reduction gearing 95. A fly wheel 94' serves to iron out sudden loads during the operation of the machine, as will presently appear. The slowly moving shaft leading out of the speed reduction gearing extends vertically as shown at 96, through a suitable bearing 96'. Mounted upon the sub base 90 and extending vertically therefrom are four posts 97, Figures 3 and 7, which are connected together at their upper ends by straps 98 which straps are disposed substantially parallel to the sub base 90. Fixed upon the straps 98 and extending upwardly therefrom and therebetween is a strap 99 which extends over the projecting end of shaft 96. Extending between the plates 98 is a second bracket 100 which serves as a pivotal support for a bifurcated operating lever 101.

A driven shaft 102 is extended through a bearing in the bracket 99 and into engagement with the shaft 96, this engagement being by means of splines or keys which permit driving torque to be transmitted to shaft 102 and permit the shaft to be moved longitudinally with respect to shaft 96. Mounted upon the upper end of shaft 102 is an arm 103 which is rigidly fixed to the shaft so as to be rotated thereby. Surrounding the shaft is a spring 104 which abuts against the arm 103 and against a flanged collar 105 that surrounds the shaft, the collar being capable of sliding along the shaft and rotating thereabout as required.

Pivotally mounted upon the arm 103 are bell crank levers 106, 107, 108 and 109, one end of these levers resting upon the flange of collar 105 as will be seen in Figures 3, 8, 9 and 10. On the opposite end of levers 106 to 109 inclusive is a mass of friction material 110 which material may conveniently be rubber, rubberized fabric, cork or the like. Bell crank levers 106 and 109 are L shaped members with pintles extending laterally from the middle of the member. Levers 107 and 108 are bifurcated at one end so as to straddle the shaft 102 and collar thereon and to engage the flanged collar 105 on opposite sides of the shaft.

Bifurcated lever 101 that is pivotally mounted upon the bracket 100 has arms which extend upon opposite sides of the hub portion of collar 105, the arms carrying a pin 111 which extends into a groove 112 in the collar so that a movement of the lever 101 around its pivot will slide the collar longitudinally along the shaft 102. Normally the unloading mechanism rests in the position in which it is shown in Figure 3, that is with the flanged collar 105 resting on the bracket 99 and with the free ends of the bell crank levers 106 to 109 inclusive below the lowermost portion of the die parts on die base 41. Motor 93 runs constantly and the unloading mechanism is, therefore, constantly rotated at a low speed. The pivots by which the bell cranks are fixed upon arms 103 are located so that when the unloading mechanism is elevated, preparatory to removing the articles from the die parts, into the position in which it is shown in Figure 8 the friction blocks 110 on the outermost pair of bell cranks 106 and 109 respectively will project into the space between the outermost row of die parts 44, Figure 5, and the innermost row of die parts in engagement with neither and the blocks 110 on bell cranks 107 and 108 will fit inside the inner row of die parts.

Figure 8:
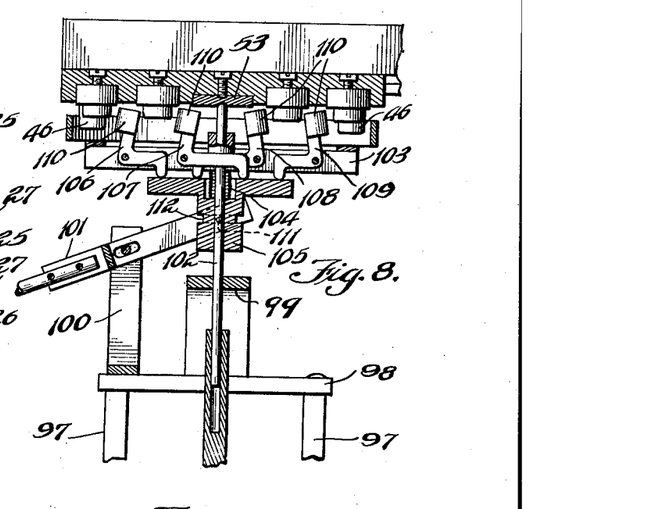
Figure 8 is a cross-sectional view through the unloading mechanism taken substantially along the line 8—8 of Figure 5 and showing the mechanism elevated in readiness for engagement with the articles that are to be unloaded.
Figure 9:
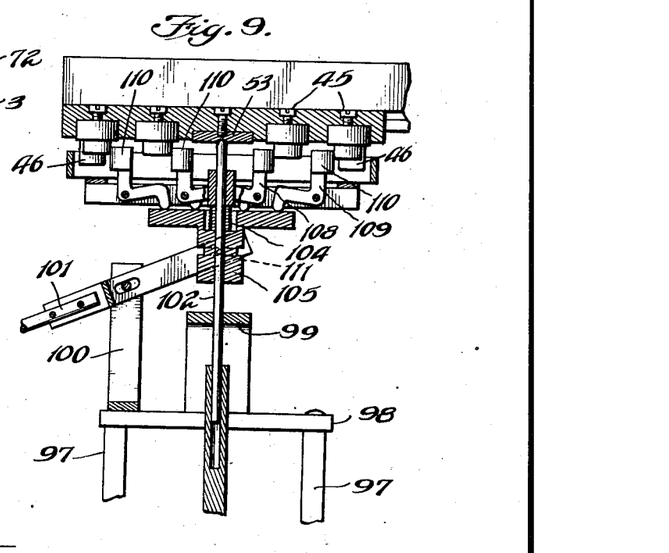
Figure 9 is a view similar to Figure 8 showing the unloading mechanism engaging the articles that are to be unloaded.

As will be seen in Figure 8, upward movement of arm 103 and the parts carried thereby, is stopped when the end of shaft 102 engages bumper land 53 on the die base 41. The end of the shaft rests in a recess in the land to insure that the axis of the shaft coincides with the center of the circles on which the die parts are located. Further movement of lever 101 moves collar 105 upwardly on shaft 102 against the tension of spring 104, the flange on collar 105 turning the bell cranks 106 to 109 inclusive on their respective pivots to move the blocks of friction material outwardly. In Figure 9, I have shown the position of the parts at the end of this movement. It will be noted that the friction material 110 on levers 106 and 109 now engages the articles on the die parts in the outer row and the blocks of friction material on the bell cranks 107 and 108 now engage the articles on the die parts on the inner row. The direction of rotation of arm 103 is such that this engagement of the blocks of friction material with the articles on the die parts and the relative movement of the blocks with respect thereto unscrews the articles from the die parts.

At the moment of contact of the friction blocks with the articles on the die parts a load is suddenly placed upon the mechanism, the momentum of the fly wheel 94' taking up the load in the usual manner. Blocks 110 are large enough to engage several articles at a time and are shaped so as to engage the articles without shock and to apply pressure thereto substantially radially so that the movement of the blocks will unscrew the articles from the die parts.

As will be seen in Figures 1 and 5 a sloping trough 120 is disposed beneath the unloading mechanism to catch the articles as they fall from the die parts and convey them into a suitable container, not shown. A guard ring 121 is mounted upon the arm 103 and is disposed above the trough 120, this guard ring preventing articles that have been freed from the die parts from flying out of the machine.

As soon as all articles have been removed from the die parts lever 101 is freed to permit the collar 105 to travel downwardly on the shaft from the position in which it is shown in Figure 8 to the position in which it is shown in Figure 3 to restore the unloading mechanism to normal.

An unloading mechanism of the type just described is particularly advantageous when the outside diameter of the articles to be unloaded from the die part is large and the number of threads by which they are held on the die parts is relatively small. Further an unloading mechanism of this type can be used only when the die parts are located on a circle. It will be apparent to one skilled in the art that the friction blocks 110 are engaged with a particular article only momentarily being brought into engagement therewith to give the article a momentary application of torque tending to unscrew it from the die part. In certain instances, particularly where the outside diameter of the part is relatively small and the number of threads relatively high, a quicker and more reliable unloading operation can be achieved by the use of an unloading mechanism of the type shown in Figures 14 and 15.

Figure 14:
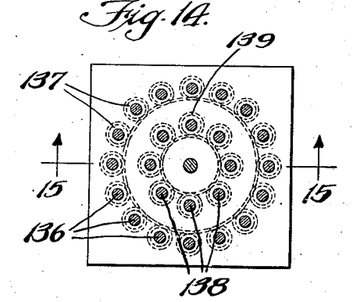
Figure 14 is a cross-sectional view taken substantially along the line 14—14 of Figure 15 showing a modified form of unloading mechanism for use with dies that are arranged on circles.
Figure 15:
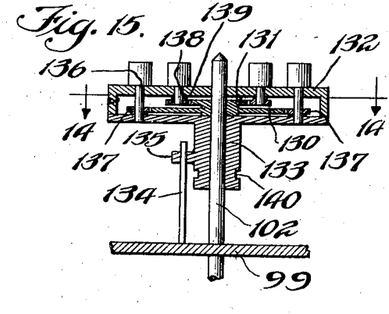
Figure 15 is a cross-sectional view of the unloading mechanism shown in Figure 14 taken along the line 15—15 of Figure 14.

In this embodiment of the invention, constantly rotating shaft 102 carries a large diameter gear 130 and a smaller diameter gear 131, both of which are keyed thereto. A stationary plate 132 is mounted upon collar 133 which surrounds the shaft 102 and is held against rotation by suitable means such as a pin 134 that is fixed upon the bracket 99 and extended through a boss 135 on the collar 133. Mounted in a plurality of aligned openings in the plate 132 and the flanged portion of the collar 133 are a plurality of shafts 136 which shafts are located with their axis in alignment with the axis of corresponding die parts 44 in the outer row of sockets in the die base 40, Figure 5. Each of these shafts carries a pinion 137 which is meshed with the gear 130 so that the shaft will be rotated as the gear is rotated. Journalled in the upper plate 132 are a plurality of shafts 138 which are located with their axis in alignment with the axis of the die parts 44 and inner row of sockets in the die base 40, Figure 5. Each shaft 138 carries a pinion 139 which is meshed with the gear 131 so that the shafts will be rotated by a rotation of the gear.

Each of the shafts 136 and 138 carries at its upper end a body of friction material such as cork, rubber, rubberized fabric or the like, which body contains a recess shaped to engage and turn the article that is to be removed from the die part.

Collar 133 corresponds in function to collar 105, Figure 8, and contains a groove 140 into which the pins carried by the bifurcated arms of the lever 101 engage. As the lever is rotated collar 133 and the parts carried thereby are elevated to bring the individual blocks of friction material into operative relation with the articles that are to be unscrewed from the die parts, that is, individual blocks are rotated in a direction which causes the parts to be unscrewed. As soon as the parts have been freed, lever 101 is released to permit the unloading mechanism to move back into its normal position.

Figure 16:
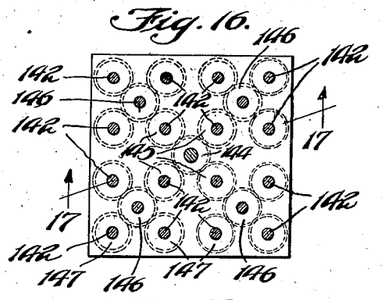
Figure 16 is a plan view of an unloading mechanism similar to the mechanism shown in Figure 14 for use with dies that are arranged in rectangular form.
Figure 17:
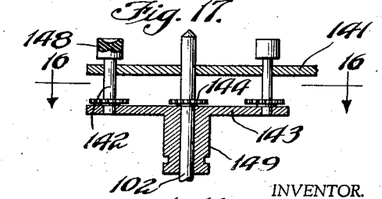
Figure 17 is a cross-sectional view through the unloading mechanism shown in Figure 16 taken substantially along the line 17—17 of that figure.

Often times a more advantageous use of the die base 40 and consequently a more advantageous use of the molding press can be achieved by arranging the die parts in parallel rows rather than on the circumference of concentric circles. In Figures 16 and 17 I have shown a modified form of unloading mechanism of the type shown in Figures 14 and 16 adapted to unscrew articles from die parts arranged in rows. In this modification, a stationary plate 141 serves as an upper support for a plurality of shafts 142 which shafts are shown as disposed four in a row with the rows parallel to each other. Mounted beneath and parallel to the plate 141 is a second plate 143 in which the lower ends of the shafts 142 are journalled. Shaft 102 carries a pinion 144 which is meshed with pinions 145 carried on the innermost shafts 142, which pinions are also meshed with a plurality of idle gears 146 that in turn are meshed with pinions 147 on the outermost shafts 142. Thus, as the shaft 102 is rotated, each of the shafts 142 will be rotated, the direction of rotation being such as to unscrew articles from die parts. Each shaft 142 contains a block of friction material 148 which is adapted to engage the article and unscrew the same from the die part.

A collar 149 surrounds the shaft 102 and is connected with the lever 101 as before, the collar being movable longitudinally on the shaft to elevate the bottom plate 143 and with it the shafts 142 to bring the blocks of friction material 148 into engagement with the articles.

Figure 12:
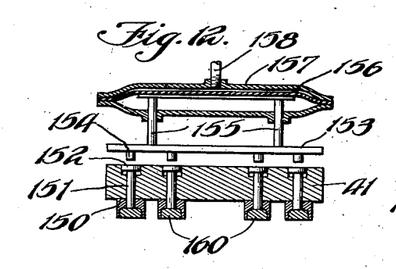
Figure 12 is a fragmentary cross-sectional view showing in its normal position an unloading mechanism for removing articles from recesses in the upper die member.
Figure 13:
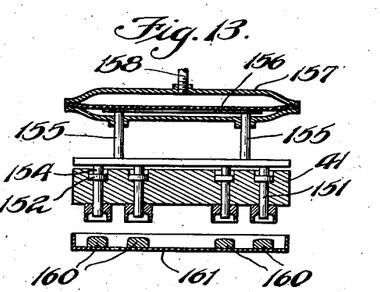
Figure 13 is a view similar to Figure 12 showing the mechanism in its operated position.

Not all articles molded in a machine of this type have to be removd from the die parts by an unscrewing operation but rather can be pushed out of the die part. In Figures 12 and 13 I have shown a mechanism for unloading the dies by pushing the articles downwardly out of recess die parts carried by the upper die base 41. In this embodiment of the invention, each die part 150 is provided with a push out pin 151 which extends through the die base 41 and terminates in a headed portion 152 that fits in a recess in the upper surface of the die base. Mounted above the die base in unloading position is a plate 153 that carries pins 154 registered with and adapted to engage the heads 152 of the push out pins. Plate 153 is supported by suitable pins on a ram 155 that in turn is engaged by a diaphragm 156 located within the chamber 157. Fluid pressure is admitted into the chamber through a pipe 158 to move the diaphragm 156 and ram 155 downwardly to bring plugs 154 into engagement with knock out pins to move those pins downwardly so as to push the articles 160 out of the die part. Plugs 154 may be operated by suitable mechanical means instead of by the fluid pressure means shown by way of example. A suitable tray 161 is disposed so as to catch the articles and convey them to the trough 120 by which they are carried out of the machine.

During the time that the unloading mechanism is operating to remove completed articles from the die parts carried upon the upper die base 41 a loading mechanism located upon the opposite side of the machine may be operated to deposit in the recesses in the die parts carried by the lower die base 40, a quantity of moldable material. Usually this moldable material is in the form of brickets or pellets which have been accurately made to contain precisely the correct amount of material required to form the article, the pellets being sufficiently solid to permit them to be handled without breaking.

In the preferred embodiment of the invention shown by way of example in the drawings, see particularly Figures 3 and 4, the loading mechanism consists of a tray-like structure 170 that is mounted upon suitable brackets 171 fixed to cross bar 33 at the outer ends of the guide rods 31 and 32. The tray may be mounted upon a stationary part of the machine, if desired.

The structure 170 extends over the position in which the die base 40 is stopped at the end of its movement outwardly from the platen 20, this extending portion containing a plurality of pockets 172 which correspond in number to and are located directly above the die parts 42 in the base 40. Mounted upon the structure 170 is a shutter 173 which has a downwardly depending lip 174 that is engaged by the die base 40 during the last part of the outward movement of that base.

In the opposite end of the structure 170 is a bin 175 in which a quantity of pellets are stored. During the time that the press is in its closed position, as will be seen in Figure 4, the perforations in the shutter 173 are out of alignment with the pockets 172 and the attendant may then place a pellet from the bin 175 in each pocket 172. When the press is opened and the die base 40 is being moved into the position in which it is shown in Figure 3, shutter 173 will be moved to the right to cause the openings in the shutter to be aligned with the pockets 172 thereby to permit the pellets to drop into the recesses in the die part. The die is then loaded in readiness for the press to be closed to form another group of articles.

Figure 18:
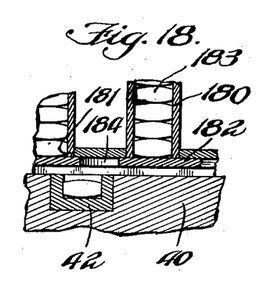
Figure 18 is a fragmentary cross-sectional view of a magazine type loading mechanism.

In certain instances it may be advantageous to have an operator attend to several machines in which case he will not have much time to devote to any one machine. Under these circumstances, a magazine type loading device may be advantageous, a device of this type being shown in Figure 18. In this modification a plurality of magazines 180 are supported upon a suitable plate 181 that overhangs the die base 40 in its open position. A shutter 182 closes the bottom of the magazine so that a plurality of pellets 183 may be stored therein. As the die base 40 moves to the right, Figure 18, a projecting lip on shutter 182 corresponding in structure and purpose to lip 174 is engaged to move the shutter so as to bring the opening 184 therein into alignment with the magazine 180. At the end of the movement of the shutter, die part 42 will also be aligned with the magazine and a pellet may drop through the shutter into the die part. As the die base 40 moves to the left, Figure 18, the shutter 182 is again moved across the bottom of the magazine after which the die part 42 moves out of registration with the opening 184 and into the closed position of the machine. The plate 181 will be provided with a magazine 180 for each of the recessed die parts 42 so that the same will be automatically loaded each time the machine is opened.

Figure 19:
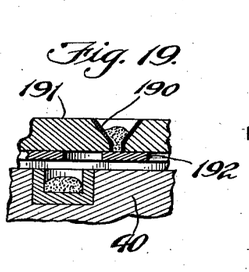
Figure 19 is a view similar to Figure 18 showing a modified form of loading mechanism.

Although pellets or brickets are most commonly used, often times the moldable material is in powder form in which case the loading mechanism may be modified in the manner shown in Figure 19. In this embodiment of the invention, a funnel-like pocket 190 is formed in a plate 191 that overhangs the die base 40. A shutter 192 closes the bottom of the pocket 190. A quantity of powder is placed in the pocket and as the shutter is moved to the right, Figure 19, by the final movement of the die base 40, the perforation in the shutter is registered with the pocket to permit the powder to fall into the recessed die part. If desired, a magazine of the type shown in Figure 18 may be used for powder, and the shutter arranged to dispense only the required amount.

Figure 11:
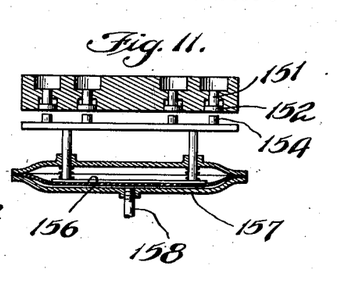
Figure 11 is a fragmentary cross-sectional view showing an unloading mechanism for removing articles from recesses in the lower die mechanism.

In the preferred embodiment of the invention shown in the drawings, the finished articles are carried on the upper die parts and the loading mechanism is shown as permanently extending over the position to be occupied by the lower die base when the machine is fully opened. In certain instances, the finished articles will remain in the lower die parts and must be removed therefrom before loading can take place. In Figure 11, I have shown an unloading mechanism adaptable for removing the articles from the lower die plate which mechanism will be recognized as the mechanism shown in Figures 12 and 13 turned through an angle of 180 degrees so as to move the knock out pins upwardly rather than downwardly. The loading mechanism is then pivotally mounted upon bracket 171 so that the same may be turned to one side to render accessible the upper surface of the die base 40 so that the extruded parts may be removed therefrom. The loading mechanism is swung back into position after the parts have been removed, the projecting tong 174 being thus brought into engagement with the end of the die base 40 to operate the shutter and release the pellets into the die part.

The machine for carrying out my invention, shown and described by way of example, may be modified within the teachings of the invention and more conventional construction may be used. Strain members 7 and 8 may be replaced by the usual rods and yokes if desired, and use of other well known systems of levers in lieu of the levers 71 and 72 is contemplated.

In carrying out the main objects of the invention many advantages are gained through a reduction of the human element in the cycle of operations and further advantages are gained by making the operations to be performed by the operator very simple. As a result no great amount of skill or strength is required on the part of the operator, and slowing up of the cycle of operations due to fatigue of the operator is eliminated, in fact, if desired, the operator may service more than one machine.

Herein a particular specific machine has been shown and described by way of example to illustrate how the teachings of the invention may be put into practice. It will be apparent to one skilled in the art that the details of the example shown may be altered within the teachings of the invention and such alterations are contemplated and I am not to be limited to the particular example described by way of illustration.

Having thus complied with the statutes and shown and described a preferred embodiment of my invention, what I consider new and desire to have protected by Letters Patent is pointed out in the appended claims:

What is claimed is:

1. In a machine for molding plastics, a die base, a plurality of die parts nested in said die base, a land located at the center of said base and having a recess, an unloading mechanism, means on said mechanism for engaging in said recess to locate the mechanism with respect to the die parts, and means in said mechanism rotatable with respect to said recess engaging means, and means for rotating said last-named means to remove completed articles from the die parts.

2. In a molding machine in which complementary die parts are separated to open the mold and then moved in opposite directions to give access to their working surfaces, a loading mechanism with which a recessed one of said die parts is registered at the end of said latter movement, said mechanism comprising, a tray, means for supporting the tray over the die part, there being a moldable material receiving recesses in said tray registered with the recesses in the die part, a shutter normally closing the recesses in said tray, said shutter containing perforations, and means engaged and moved by the moving recess die part for moving the shutter to register the perforations therein with the recesses in said tray to permit moldable material therein to be discharged into the die part.

3. A molding machine for producing articles from moldable material, comprising, complementary die sections which when closed together define the contours of the article, mounting means for said die sections arranged to permit translatory movement of the sections relative to each other in two directions, one of which is at right angles to the other, a hydraulic ram carrying one of said sections and operable to produce said relative movement of the sections in one of said directions, and means actuated by said ram for simultaneously moving both of the sections relative to each other in the other one of said directions during part of said first movement of said one section.

4. A molding machine for producing articles from moldable material, comprising, complementary die sections which when closed together define the interior and exterior contour of the article, mounting means for said die sections arranged to permit relative translatory movement of the sections in two directions one vertical and the other horizontal, a hydraulic ram carrying one of said sections and operable to produce said relative movement vertically, and means activated by said ram for moving both of said sections horizontally in opposite directions during part of said vertical movement of said one section.

5. In a molding machine, a frame, strain members shaped as hollow rectangles mounted on said frame and extending thereabove, a platen fixed on the upper horizontal parts of said strain members, guide bars fixed on said platen, die means supported in juxtaposition to said platen by said guide bars, a cylinder fixed upon the lower horizontal parts of said strain members, a ram fitted in said cylinder, a platen fixed upon said ram, guide bars fixed upon said last-named platen, die means supported in juxtaposition to said last-named platen by said guide bars, means for admitting fluid pressure to said cylinder to raise said ram and the die means supported thereon, means connected to said ram and frame for moving both die means horizontally on their respective guide bars relative to each other and in opposite directions to register the same together preparatory to closing and means on said platens for stopping the horizontal movement of said die means.

6. A molding machine for producing articles from moldable material, comprising, two complementary die sections which when closed together define the contours of the article, mounting means for said die sections arranged to permit relative movement of the sections in two directions one vertical and the other horizontal, means for moving one of said die sections to produce said relative movement vertically, and means actuated by said moving means for simultaneously moving both of said sections horizontally in opposite directions during part of said vertical movement of said one section.

7. An unloading device for unscrewing molded articles from thread forming die parts that are arranged in rows on the circumferences of concentric circles, comprising, a shaft mounted with its axis coinciding with the center of said circles and adapted for movement along said axis, means for rotating said shaft, an arm fixed on said shaft, bell crank levers pivoted on said arm there being a lever for each of said rows of die parts, a block of friction material on each bell crank, means for elevating said shaft, arm and parts carried thereby to position said blocks of friction material alongside of said rows of die parts, and means for rotating said bell crank levers on their pivots to bring said blocks into engagement with articles on the die parts to unscrew them therefrom as the blocks rotate.

8. An unloading device for unscrewing molded articles from thread forming die parts which are arranged on the circumferences of concentric circles, comprising, a shaft disposed with its axis coinciding with the center of said concentric circles, means for rotating said shaft, an arm carried on said shaft, and rotated thereby, friction blocks on said arm, and means for elevating said shaft arm and friction blocks to engage the blocks with the articles which are unscrewed by the rotation of the blocks around the axis of the shaft.

9. In a molding machine, a frame, strain members shaped as hollow rectangles mounted on said frame and extending thereabove a platen fixed on the upper horizontal parts of said strain members, guide bars fixed upon said platen and extending horizontally therefrom, a cylinder fixed on the bottom horizontal parts of said strain members, a ram fitted in said cylinder, a platen fixed upon said ram, guide bars fixed upon said last-named platen and extending horizontally therefrom, die means supported in juxtaposition to said platens by said guide bars, an unloading device mounted upon said frame in position to register with one of said die means when the latter is in a position away from its platen, a loading device mounted upon the latter guide bars in juxtaposition to said second platen and in a position to register with the die means thereon when the latter is in a position away from its platen, means for admitting fluid pressure to said cylinder to raise said ram and the devices carried thereby, and means connected to said ram and frame for moving said die means on said guide bars by the initial movement of the ram from their positions away from their respective platens to a position in register with one another and with said platens the same together for closing by the final movement of the ram.

10. The method of producing articles molded in multi-cavity complementary die members which comprises, moving the die members after the completion of a molding operation in relatively translatory movements in two directions at right angles to each other, the first movement opening the die members to draw the articles from one member and to supply clearance between the members, the second movement moving both die members in opposite directions and at right angles to the first movement to separate the die members to render the same accessible, loading the die members from which the articles were withdrawn with moldable material, unloading the articles from the other die member, and moving the die members in reverse directions to close the same together in molding position.

11. The method of producing articles molded in multi-cavity complementary die members which comprises, moving the die members apart after the completion of a molding operation to open the same and to draw the articles from one of the die members, continuing said movement just far enough to provide clearance between the articles and the die member from which the same were drawn, moving the die members in opposite directions and at right angles to the first movement to render the same accessible, mechanically placing moldable material in the die member from which the articles were drawn while simultaneously mechanically unloading the articles from the other die member, and moving the die members in reverse directions to close the same together in molding position.

JOHN L. HOWIE, Jr.